(No Model.) 4 Sheets—Sheet 1.

S. J. CONKWRIGHT.
CONVERTIBLE AGRICULTURAL MACHINE.

No. 527,363. Patented Oct. 9, 1894.

Fig. 1.

Witnesses:
Whit Currett,
Thos. A. Green

Inventor:
Stonewall J. Conkwright.
By James L. Norris.
Atty.

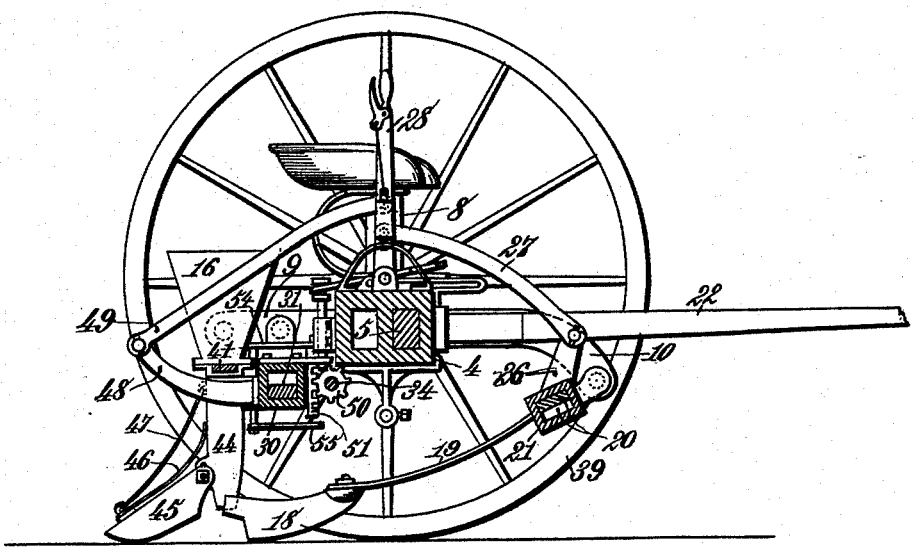

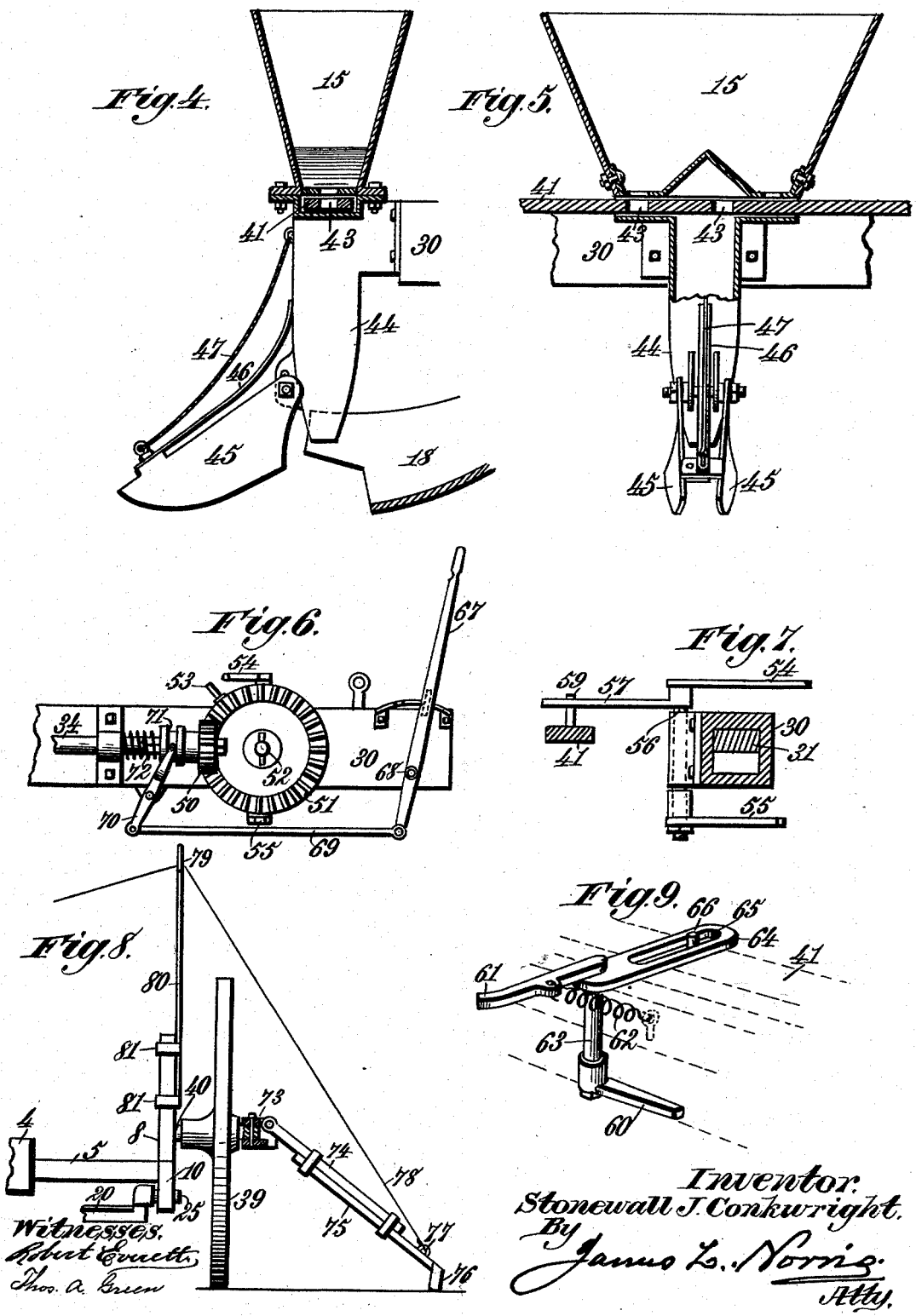

(No Model.) 4 Sheets—Sheet 4.

S. J. CONKWRIGHT.
CONVERTIBLE AGRICULTURAL MACHINE.

No. 527,363. Patented Oct. 9, 1894.

Witnesses.
Robert Emmett,
Thos. A. Green

Inventor.
Stonewall J. Conkwright.
By James L. Norris.
Atty.

and in which are adapted to slide lengthwise the two independent axles 5 having a series of perforations, as at 6, through which locking pins 7 can be passed for the purpose of# UNITED STATES PATENT OFFICE.

STONEWALL J. CONKWRIGHT, OF WINCHESTER, KENTUCKY.

CONVERTIBLE AGRICULTURAL MACHINE.

SPECIFICATION forming part of Letters Patent No. 527,363, dated October 9, 1894.

Application filed May 26, 1894. Serial No. 512,527. (No model.)

*To all whom it may concern:*

Be it known that I, STONEWALL J. CONK-WRIGHT, a citizen of the United States, residing at Winchester, in the county of Clark and State of Kentucky, have invented new and useful Improvements in Convertible Agricultural Machines, of which the following is a specification.

The chief object of the present invention is to provide a new and improved machine which is adjustable in width, and has provision for the operative connection therewith of various interchangeable agricultural implements, particularly a corn planter, a hay-rake, a grain-drill, and a land-roller.

The invention also has for its object to provide a machine of the character alluded to, wherein the wheel-axles are independently adjustable and carry the means whereby the interchangeable agricultural implements referred to can be utilized, and the width of the machine can be contracted to the minimum without the ends of the axle projecting in those laterally adjustable machines wherein the ground-wheels are adjustable on the axle.

The invention also has for its objects to provide a new and improved corn-planter which can be conveniently and quickly adjusted laterally to vary the width of the rows; to provide a laterally adjustable corn-planter and furrow-runners which can be simultaneously raised and lowered by working a single lever; and to provide novel guide-line markers which are laterally adjustable with the wheel-axles, and either one of which can be conveniently raised by the driver out of contact with the ground.

To accomplish all these objects my invention consists in the features of construction and the combination or arrangement of devices hereinafter described and claimed, reference being made to the accompanying drawings, in which—

Figure 10:
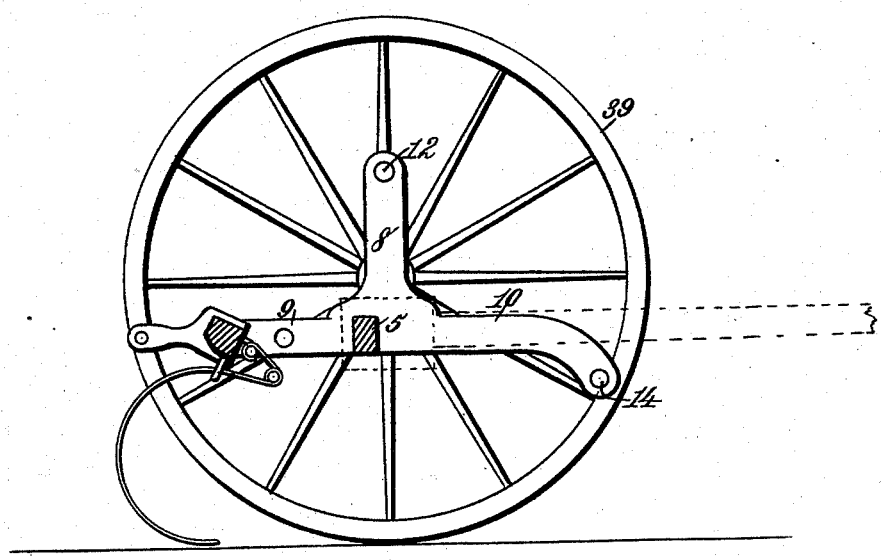
Figure 11:
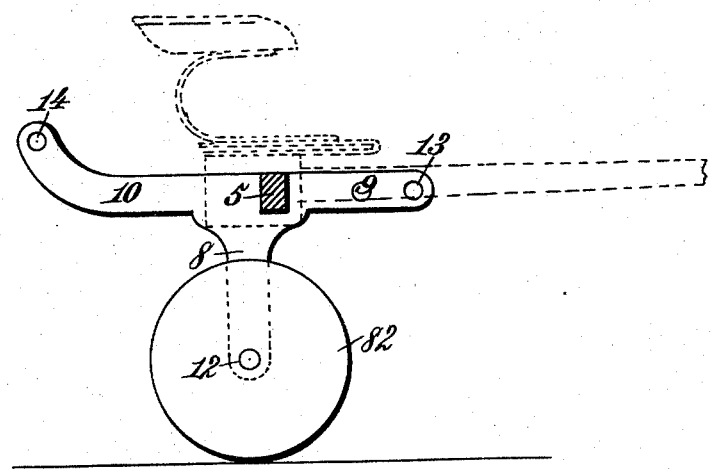

Figure 1 is a plan view, showing my invention embodied in a corn-planter. Fig. 2 is a vertical sectional view, taken on the line 2—2, Fig. 1. Fig. 3 is a vertical sectional view, taken on the line 3—3, Fig. 1. Fig. 4 is a detail sectional view through one of the hoppers of the corn-planter. Fig. 5 is a similar view taken on a line at right angles to the plane of section, Fig. 4. Fig. 6 is a detail plan view, showing a clutch mechanism for throwing the draft gear of the corn-planter into and out of operative connection with the countershaft driven by one of the ground wheels. Fig. 7 is a detail sectional view, showing the tappet devices for reciprocating the corn-dropper slide. Fig. 8 is a detail front elevation of a portion of the machine, showing one of the axles, a guide line marker, and the support for the cord or cable by which the marker is raised by the driver. Fig. 9 is a detail view, showing a modification of the tappet devices for actuating the corn-dropper slide. Fig. 10 is a vertical sectional view, showing a rake-head mounted in the machine; and Fig. 11 is a similar view, showing a land-roller mounted in the machine.

In order to enable those skilled in the art to make and use my invention, I will now describe the same in detail, referring to the drawings, wherein—

The numeral 4 indicates a housing or boxing rectangular or square in cross-section, and in which are adapted to slide lengthwise the two independent axles 5 having a series of perforations, as at 6, through which locking pins 7 can be passed for the purpose of holding the axles in any position to which adjusted. The outer end portion of each axle is triple-armed or provided with three separate arms 8, 9, and 10 which extend radially from the axle, and have at their outer extremities the bearings 12, 13, and 14 for receiving journals or studs on the agricultural implements hereinafter explained, whereby interchangeable implements can be mounted in operative connection with the axles.

As illustrated in Figs. 1 and 2, a corn-planter, comprising three hoppers or seed boxes 15, 16 and 17, is arranged in connection with the axles, and this corn-planter is laterally adjustable for the purpose of varying the width of the rows.

The furrow-runners or openers 18 are secured to the rear ends of elastic or other suitable arms 19 having their front ends attached to a laterally extensible head composed of two bars 20, adapted to slide lengthwise in a secondary housing or boxing 21 arranged below the tongue 22, or otherwise. The bars 20 are provided with perforations 23, through which pins 24 may pass to lock the bars in the position to which adjusted. The outer ends of the bars are provided with journals or stud-bearings 25 mounted in the bearings 14 of the arms 10, so that the head, composed of the bars 20 and housing or boxing 21, can rock or turn for the purpose of raising or lowering the furrow-runners or openers. The secondary housing or boxing 21 is provided with an upwardly projecting rigid arm 26, pivotally attached to one end of a link 27 which, at its other end, is pivotally attached to an upright lever 28, provided with a suitable latch to engage notches in a segmental locking-plate 29 mounted on the main housing or boxing 4.

The main frame of the corn-planter attachment comprises a housing or boxing 30 and bars 31 slidable lengthwise in said boxing or housing, and provided at their outer ends with stud-bearings 32 mounted in the bearings 13 of the arms 9. The bars 31 will be held in the position to which adjusted by locking pins, substantially as described with reference to the axles 5 and bars 20. The bars 31 are provided with suitable brackets, as at 33, to support a drive-shaft 34, which can be lengthwise extended or contracted through the medium of a sleeve 85 and set-screw 36, Fig. 1. The outer end of the shaft 34 is provided with a pinion 37 meshing into a gear-wheel 38 mounted on the hub of one of the ground-wheels 39. The ground-wheels are adapted to rotate on spindles 40 which are fixed to the arms 8 out of line with the axles 5, so that the spindles are, in effect, eccentrically arranged relatively to the axles.

The corn hoppers may be provided with any suitable mechanism for dropping the corn in hills, or for drilling the corn, but as here shown the corn-dropping device comprises a dropping slide-head in sections 41, one for each hopper, which sections are adjustably connected by connecting plates 42, so that the length of the dropping-slide can be varied to suit the conditions required when the corn-planter is laterally adjusted. The slide-sections 41 are provided with pockets, as at 43, Figs. 4 and 5, to receive the corn from the hoppers and deposit the same in the conducting tubes 44, by which the corn is deposited in the furrows produced by the furrow-runners or openers 18. The operation of this type of corn-dropping slides is well known, and therefore further explanation in this respect is deemed unnecessary. The conducting tubes 44 are provided with pivoted coverers 45, acted upon by springs 46, which tend to constantly press the coverers downward, for the purpose of covering the corn deposited in the furrows. The coverers are connected with the conducting tubes by suitable flexible connections 47, so that when the corn planting attachment is raised, as hereinafter explained, the coverers will be also raised for clearing stumps or other obstacles.

The stud-bearings 32 of the bars 31 constitute journals for the purpose of turning or rocking the corn-planter attachment, so that it is possible to raise the corn-planter bodily, and this is accomplished through the medium of a rigid arm 48 attached to the housing or boxing 7 and pivotally attached to one end of a link 49, the other end of which is pivotally attached to the lever 28 at a point above the attachment for the link 27, in such manner that when the lever 28 is pushed or moved forward the corn-planter attachment will be swung to a raised position, and simultaneously therewith the secondary housing or boxing 21 will be swung and the furrow-runners or openers 18 elevated.

By the means described the corn-planter attachment, the covering shoes, and the furrow-runners or openers are simultaneously raised by the movement of a single lever for the purpose of enabling the machine to pass over stumps or other obstructions which may be encountered.

The corn-dropping slide, composed of the adjustable sections 41, is adapted to be intermittently reciprocated for the purpose of dropping the corn in hills, and is also adapted to be rapidly reciprocated for drilling corn. For the purpose of operating the corn-dropping slide, the inner end of the shaft 34 is provided with a pinion 50 engaging a gear 51, journaled on a stud 52, fixed to the boxing or housing 30. The periphery of the gear 51 is provided with a radially projecting pin 53, adapted to strike tappets 54 and 55 which are mounted on the upper and lower ends of an oscillatory spindle 56 having a rearwardly projecting arm 57 provided with a slot 58, with which engages a vertical pin 59 on one of the dropper slide-sections 41, all in such manner that when the machine is moving forward and the pinion 50 is in operative connection with the gear 51, the pin 53 will move the tappet arm 54 in one direction, and the tappet 55 in the opposite direction, thereby oscillating or rocking the spindle 56 and imparting a reciprocating movement to the dropper-slide. If both tappet-arms 54 and 55 are in operative position, as in Fig. 7, the dropper-slide will be intermittently reciprocated for the purpose of planting the corn in hills, but it is possible to drill the corn by a rapidly reciprocating motion of the dropper-slide; and to accomplish this object, I may employ the modified construction, Fig. 9, wherein the lower tappet-arm 60 can be thrown laterally out of operative position, and the upper tappet arm 61 permitted to stand in operative position to be successively struck by a plurality of pins, such as the pin 53, mounted on the periphery of the gear 51. The pins will move the tappet arm 61 in one direction, and a spring 62 will quickly restore the tappet-arm 61 to its normal position to be struck by the succeeding pin. The tappets 60 and 61 are mounted on a spindle 63, similar to the spindles 56, and this spindle is provided with an arm 64 having a slot 65 with which engages a pin 66 on one of the dropper-slide sections, substantially as hereinbefore explained. By this means the continued rotation of the gear 51 will rapidly reciprocate the dropper-slide and the corn will be drilled. The rapidity of reciprocating the dropper-slide for drilling purposes will depend on the number of pins, such as pin 53, used on the gear 51.

As here illustrated, the housings or boxings 4 and 21 are mounted on a tongue or pole 22, but obviously they may be otherwise mounted, particularly if a single draft animal is used.

The operation of the corn-dropping slide is under control of the driver through the medium of a lever 67, Fig. 6, pivoted as at 68, to the housing or boxing 30, and connected by a link 69 with a pivoted lever 70 connected with a grooved-collar 71, which is rigidly connected with the pinion 50. The collar 71 rotates with the shaft 34, but is adapted to move along the length thereof, and is normally pressed toward the gear 51 by a spring 72, whereby the pinion 50 can be thrown out of operative connection with the gear 51 by moving the lever 67 in the proper direction. The lever 67 is, in practice, provided with any suitable devices, such as ordinarily used for holding it in the position to which it is adjusted.

In many uses of the machine it is desirable to mark the land with a guide-line as usual for ordinary purposes; and to accomplish this I provide the end of each wheel-spindle 40 with a removable sleeve or coupling 73, to which is pivotally attached a marker bar or arm composed of two sections 74 and 75, Fig. 8, adapted to slide lengthwise, one upon the other, for varying the length of the bar or arm. The section 75 is provided at its outer end with a marker 76, and with an eye 77, to which is attached one end of a cord or cable 78, which extends upward and through a guide 79 to a point within convenient reach of the driver. The guide 79 is formed on the upper end of a guide-arm 80 having sleeves 81, by which it can be attached to the short arm 8 of a wheel-axle 5.

By providing each of the wheel-spindles with a marker-bar or arm of the character described, and connecting each of the same with a cord or cable adapted to be operated by the driver, it is entirely unnecessary to remove a marker-bar from one side of the machine and apply it to the opposite side for the purpose of properly marking the land. In my invention it is only necessary to operate one of the cords or cables 78 to raise one of the marker-bars or arms from the ground, leaving the other marker-bar or arm in contact with the ground to produce the guide-line. This is a very desirable feature of my invention and avoids the loss of time and annoyance in shifting the usual marker-bar from one side of the machine to the opposite side.

In my improved machine, each independent axle 5 is lengthwise adjustable in a boxing or housing, as hereinbefore explained, and each axle is tripple-armed, in such manner that the axles can be removed from the housing or boxing 4 and reversed, in order for example to place the bars 8 beneath the housing or boxing 4, as in Fig. 11, instead of above as in Figs. 1, 2, 3, and 10. In this position the ends of the shaft of a land-roller 82 can be mounted in the bearings 12 of the arms 8 for the purpose of rolling land. Again, it is possible to entirely detach the corn-planter attachment and mount in the arms 9 a rake-head, as in Fig. 10, for raking hay and the like. Inasmuch as the construction of the rake, and the mechanism for operating the same does not constitute any part of the present invention, I do not deem it necessary to further illustrate the rake mechanism, and any suitable rake operating mechanism may be employed.

I merely illustrate the rake to indicate the manner in which different implements may be placed in operative connection with the axles.

From the foregoing it will be obvious that with my improved machine it is possible to vary the width of the same to meet any condition required; and also to employ a corn-planter, a rake, a land-roller, or any other suitable implement ordinarily used in farming. If a cultivator or harrow is to be used it may be connected with the housing or boxing 4 through the medium of the pendent brackets, as at 3, Fig. 2. If a cultivator or harrow is used I prefer to employ one composed of disks, but of course any other type can be used.

The important features of the machine reside in the independently adjustable axles, each having a rearwardly extending arm provided with a bearing to receive journals or studs on the implement which is to be placed in operative connection with the axles. The tripple-armed construction of the axles enables various implements to be used in connection with my improved machine, and is especially advantageous in a corn-planter adapted to be laterally adjusted, in that some of the arms serve to support the head to which the furrow-runners or openers are attached, while other arms serve to support the corn-planter proper through the medium of journals or stud-bearings 32, as before explained.

The wheel-spindles 40 are stationary and rigidly fixed to the arms 8, and the ground-wheels rotate on the spindles, so that it is possible to conveniently and quickly remove the ground-wheels and detach and reverse the axles to place the radiating arms 8, 9, and 10 in various positions to suit the conditions required for arranging different implements in connection with the axles.

In the operation of the corn-planting mechanism it is possible for the driver to shift the lever 67 to stop the reciprocating motion of the corn-dropping slide and permit the latter to be operated by hand. This is desirable for many purposes, in that if the machine is not running correctly the lever can be operated, and the corn-dropping slide can then be operated at the required time to drop the corn. I do not deem it necessary to illustrate devices for operating the corn-dropping slide by hand, as this is a well known expedient.

By means of the lever 67, the pinion 50 can be thrown out of engagement with the gear 51, and the first row of corn can be dropped in the line by operating the corn-dropping slide by hand before starting the team. It will be obvious that the driver can at any point drop the corn by hand if he observes that the machine is out of line.

The driver's seat is preferably of that type which can be shifted back and forth in order to properly balance the machine and the coverers. For this purpose a slotted connection between the seat-standard and the frame of the machine is provided, as clearly shown in Fig. 1.

The coverers 45 can be raised or lowered to different heights through the medium of orifices in the conducting tubes 44, and preferably the coverers are adjustable laterally, so that they can be more or less opened in rear to regulate the quantity of dirt gathered and deposited on the corn.

My invention provides a very simplified construction, whereby it is possible to use in one machine various implements ordinarily used in farming, such as a corn-planter, a rake, a grain-drill, or a land-roller.

In my improved construction, the width of the machine can be contracted to the minimum without the presence of projecting axle ends as in those machines having the ground-wheels adjustable on the axle, so that to whatever width the machine is adjusted it presents a compact and finished appearance, and is perfectly practicable for the various uses hereinbefore referred to.

Having thus described my invention, what I claim is—

1. In a convertible agricultural machine, the combination with a boxing or housing to which draft devices are connected, of independent axles adjustable lengthwise in the boxing or housing, and each having at one end portion a wheel-spindle and a radially projecting arm provided with a bearing for receiving a journal or stud on the implement to be attached, substantially as described.

2. In a convertible agricultural machine, the combination with a boxing or housing to which draft devices are connected, of independent axles adjustable lengthwise in the boxing or housing, and each having at one end portion a wheel-spindle and a plurality of radiating arms, each provided with a bearing for receiving a journal or stud on the implement to be attached, substantially as described.

3. In a convertible agricultural machine, the combination with a boxing or housing, of independent axles adjustable lengthwise in the boxing or housing, and each having at one end portion a non-rotary wheel-spindle and a plurality of radiating arms of different length, each arm provided with a bearing for receiving a journal or stud on the implement to be attached, substantially as described.

4. In a convertible agricultural machine, the combination with a boxing or housing, of independent axles adjustable lengthwise in the boxing or housing, and each having at one end portion a wheel-spindle and a plurality of radiating arms adapted to receive and support interchangeable agricultural implements, substantially as described.

5. In a convertible agricultural machine, the combination with a boxing or housing, of independent axles adjustable lengthwise in the boxing or housing, and each having at one end portion a wheel-spindle and a rearwardly projecting arm, and a corn-planter attachment comprising lengthwise adjustable bars having their outer ends removably journaled in the said arms of the wheel-axles, a lengthwise adjustable dropper slide, devices actuated by one of the ground wheels for operating the dropper slide, and lever mechanism for rocking the corn planter attachment on said rearwardly projecting arms, substantially as described.

6. In a convertible agricultural machine, the combination with a boxing or housing, of independent axles adjustable lengthwise in the boxing or housing, and each having at one end portion a wheel-spindle and a plurality of radiating arms each provided with a bearing, a corn-planter attachment comprising lengthwise adjustable bars provided with journals or studs journaled in the bearings of two of said arms, a lengthwise adjustable head carrying furrow-runners or openers and provided at its ends with journals or studs mounted in the bearings of other radiating arms, and means for raising the corn-planter attachment and the furrow-runners or openers, substantially as described.

7. In a convertible agricultural machine, the combination with a boxing or housing, of independent axles adjustable lengthwise in the boxing or housing, and each having at one end portion a wheel-spindle and a plurality of radiating arms, a corn-planter attachment comprising lengthwise adjustable bars having their outer ends pivotally mounted in two of said radiating arms, a lengthwise adjustable head provided with runners and having its outer ends mounted in other radiating arms, and a lever having link connections with the corn-planter attachment and with the head carrying the furrow-runners or openers for simultaneously raising said corn-planter attachment and said furrow-runners or openers, substantially as described.

8. In a convertible agricultural machine, the combination with a boxing or housing, of independent axles adjustable lengthwise in the boxing or housing, and each having at one end portion a wheel-spindle and a plurality of radiating arms each provided with a bearing, a corn-planter attachment comprising lengthwise bars having their outer ends provided with journals or bearings pivotally mounted in the bearings of two of said radiating arms, a lengthwise adjustable head carrying furrow-runners or openers and provided at its outer ends with journals or studs mounted in the bearings of other radiating arms, a lever having link connections with the corn-planter attachment and with the head carrying the furrow-runners or openers for simultaneously raising the corn-planter attachment and the furrow-runners or openers, a lengthwise adjustable countershaft driven by one of the ground-wheels, and devices operated by said shaft for reciprocating the dropper-slide of the corn-planter attachment, substantially as described.

9. In a convertible agricultural machine, the combination with a boxing or housing, of independent axles adjustable lengthwise in the boxing or housing, and each having at one end portion a wheel-spindle and a plurality of radiating arms, a corn-planter attachment comprising a lengthwise adjustable dropper-slide and lengthwise adjustable bars having their outer ends pivotally mounted in two of said radiating arms, a lengthwise adjustable head carrying furrow-runners or openers and having its outer ends pivotally mounted in other radiating arms, a lever having link connections with the corn-planter attachment and the head carrying the furrow-runners or openers for simultaneously raising the corn-planter attachment and the furrow-runners or openers, a lengthwise adjustable countershaft geared to one of the ground-wheels, a pin-wheel geared to and rotated by the countershaft, and tappet-arms connected with the dropper-slide and actuated by the pin-wheel, substantially as described.

10. In a convertible agricultural machine, the combination with a boxing or housing, of independent axles adjustable lengthwise in the boxing or housing, and each having at one end portion a wheel-spindle and a plurality of radiating arms, a corn-planter attachment bodily removable and comprising lengthwise adjustable bars pivotally mounted in two of said radiating arms and provided with brackets supporting a countershaft, gearing between the countershaft and one of the ground-wheels, and devices operated by the countershaft for reciprocating the dropper-slide of the corn-planter attachment, substantially as described.

11. In a convertible agricultural machine, the combination with a boxing or housing, of independent axles adjustable lengthwise in the boxing or housing, and each having at one end portion a wheel-spindle and a plurality of radiating arms, a corn-planter attachment bodily removable and replaceable and comprising a lengthwise adjustable dropper-slide and lengthwise adjustable bars pivotally and removably mounted in two of said radiating arms and provided with brackets carrying a lengthwise adjustable countershaft geared to one of the ground-wheels, a pin-wheel, devices operated by the pin-wheel for reciprocating the dropper-slide, and a pinion mounted on the said countershaft and movable into and out of gear with the pin-wheel for controlling the action of the dropper-slide, substantially as described.

12. In a convertible agricultural machine, the combination with lengthwise adjustable axles having wheel-spindles, of sleeves or couplings mounted on the wheel-spindles, marker-bars pivoted to the sleeves or couplings to swing vertically, vertically extending guide-arms provided with cord or cable-guides, and cords or cables passing through said guides and connected with the marker-bars, whereby the driver can raise either marker-bar, substantially as and for the purposes described.

13. In a convertible agricultural machine, the combination with lengthwise adjustable axles provided with wheel-spindles, of marker-bars pivotally connected with the wheel-spindles, vertically extending guide-arms provided with cord or cable-guides, and cords or cables extending through said guides and connected with the marker-bars, whereby the driver can raise either marker-bar, substantially as and for the purposes described.

14. The combination with a main frame, a pivotally mounted corn-planter attachment, adapted to rock in said main frame, devices for operating the corn dropping devices, and a pivotally mounted head provided with furrow-runners or openers, of a single lever, and two links extending forward and rearward and connected to the lever and to the corn-planter attachment, and the head carrying the furrow-runners or openers, whereby the corn-planter attachment and the furrow-runners may be simultaneously raised by the movement of a single lever, substantially as described.

In testimony whereof I have hereunto set my hand and affixed my seal in presence of two subscribing witnesses.

S. J. CONKWRIGHT. [L. S.]

Witnesses:
ALBERT H. NORRIS,
VINTON COOMBS.